United States Patent [19]
Savant

[11] Patent Number: 6,021,936
[45] Date of Patent: Feb. 8, 2000

[54] GUN BOOT MOUNT FOR ATV

[76] Inventor: Kevin D. Savant, P.O. Drawer 520, Kinder, La. 70648

[21] Appl. No.: 09/239,136

[22] Filed: Jan. 28, 1999

[51] Int. Cl.$^7$ ....................................................... B60R 9/00
[52] U.S. Cl. .......................... 224/401; 224/282; 224/545; 224/547
[58] Field of Search .................................... 224/401, 408, 224/410, 282, 501, 502, 505, 506, 913, 553, 545–548; 211/64

[56] References Cited

U.S. PATENT DOCUMENTS

| | | | |
|---|---|---|---|
| 4,823,673 | 4/1989 | Downing | 89/37.04 |
| 5,476,188 | 12/1995 | Hassenpflug | |
| 5,706,990 | 1/1998 | Lahrson | |
| 5,878,929 | 3/1999 | Leonard | 224/101 |

Primary Examiner—Gregory M. Vidovich
Assistant Examiner—Maerena W. Brevard
Attorney, Agent, or Firm—Robert N. Montgomery

[57] ABSTRACT

A gun mounting bracket for ATV's adaptive to a variety of cargo racks generally employed by ATV's and further provides adaptability of a wide range of gun scabbards or boots designed for a variety of different type guns. The bracket includes a base plate member having a plurality of holes and slots which may be used in combination with U-bolts and clamps for attachment, a pivotal plate member which provides a method for rotating the boot to angular positions relative to the base plate and a rotatable bar loop, which is fully adaptable to gun boots having a variety of shapes and sizes. The bar loop is provided for insertion of the barrel portion of the gun boot therein to a point which generally positions the boot relative to the bracket and its latching mechanism. The bar loop, being rotatable, allows the loop to be rotated to more closely conform to the boot's width. A swing latch and pin arrangement, mounted on the pivotal plate, is cooperative with a retaining loop generally found approximately midway along the base of most rigid gun boots.

11 Claims, 5 Drawing Sheets

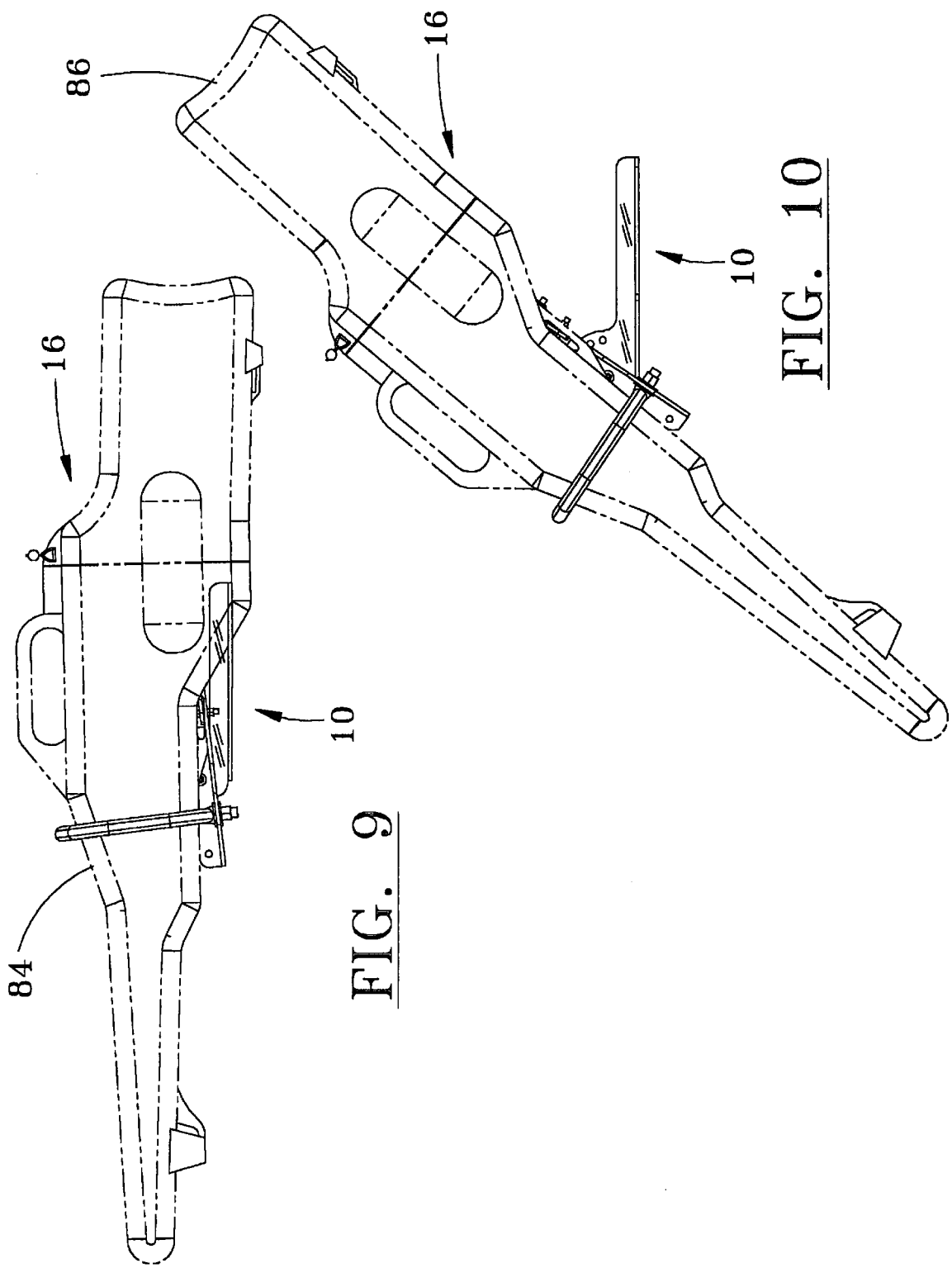

GUN BOOT MOUNT FOR ATV

BACKGROUND OF THE INVENTION

1. Field of the Invention

This invention relates generally to gun mounting brackets for all-terrain vehicles (ATV) and more particularly to a mounting bracket universally adapted to ATV's for retaining various lockable type rigid gun boots.

2. General Background

Equipment racks and various types of gun mounts which are adaptable to ATV's are well known within the art. Guns, such as rifles and shotguns, have been carried in scabbards for attachment to horse saddles for a great many years. However, more recently such scabbards have become more sophisticated by providing a rigid, padded case which totally encloses the gun and further locking the case, thereby protecting the gun environmentally and thwarting theft. Gun boots have been adapted for use in numerous applications such as for fixed attachment to tree stands as disclosed by U.S. Pat. No. 5,476,188. Rigid gun boots are now becoming more elaborate and are being used more widely, thus requiring additional methods for mounting them for transport to hunting and camp sites. One such method is disclosed for adaptation and transport by RTV's in U.S. Pat. No. 5,706,990. This arrangement provides a universal bracket mountable to the cargo rack of the RTV and provides an attachment for a specific type of rigid gun boot or scabbard configured to be paired with the mounting bracket. There is also provided a method for pivoting the scabbard from a horizontal position to an angular position. This apparatus requires the hunter to purchase both the scabbard and the bracket as a mated unit and is even further limited to the type of gun for which the scabbard is designed. Therefore, a need exists for a bracket adaptable to ATV's which will allow for universal mounting of a variety of gun scabbards or boots, further removably lock the boot securely to the mounting bracket, and provide additional positioning.

SUMMARY OF THE INVENTION

The gun mounting bracket for ATV's disclosed herein provides for the adaptation of the bracket to a variety of cargo racks generally employed by ATV's and further provides adaptability of a wide range of gun scabbards or boots designed for a variety of different type guns. The bracket includes a base plate member having a plurality of holes and slots which may be used in combination with U-bolts and clamps for attachment to luggage or cargo racks fixed to various types of ATV's, a pivotal plate member which provides a method for rotating the boot to angular positions and a rotatable bar loop, which is fully adaptable to gun boots having a variety of shapes and sizes. The bar loop is provided for insertion of the barrel portion of the gun scabbard or boot therein to a point which generally positions the boot relative to the bracket and its latching mechanism. The bar loop, being rotatable, allows the loop to be rotated to more closely conform to the boot's width. A swing latch and pin arrangement, mounted on the pivotal plate, is provided which is cooperative with a retaining loop generally found approximately mid way along the base of most rigid gun boots. The latch being positional relative to the bracket for mating with the boot's retaining loop depending on the type and size of the gun boot. The bracket may be mounted on a variety of cargo racks and in a variety of positions which offer the least obstruction to the rider, while providing easy access to the gun. These essentials and their operating advantages will become more clear when taken together with the following descriptions and drawings

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein illustrations shown with phantom or dashed lines represent the prior art not claimed herein;

FIG. 9 is a side elevation view of the pivotal bracket shown pivoted to the horizontal position relative the base plate; and FIG.10 is a side elevation of the pivotal bracket shown pivoted in the angular position.

DETAILED DESCRIPTION OF THE PREFERRED EMBODIMENT

Figure 1:
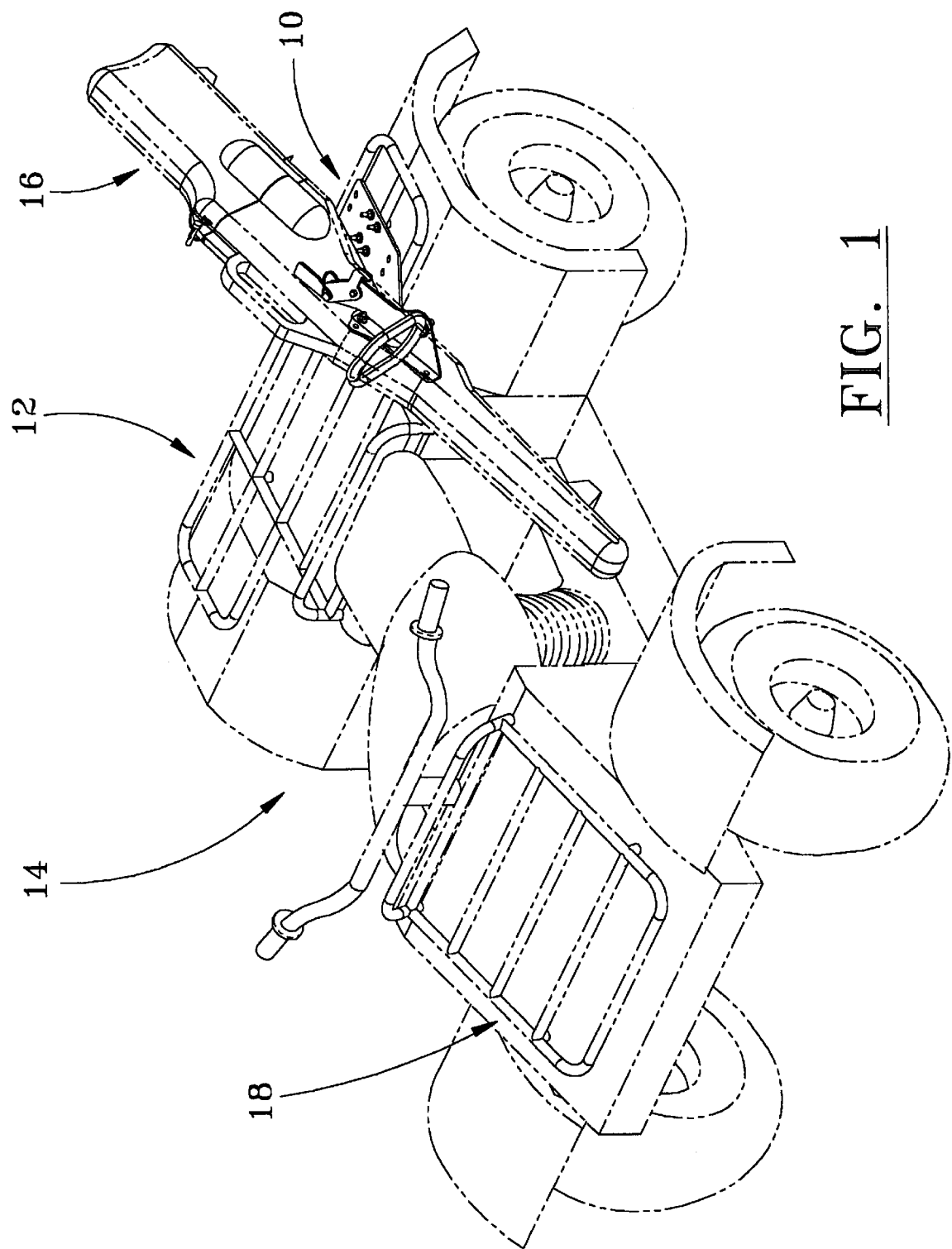
FIG. 1 is an isometric assembly view illustration of the preferred bracket embodiment, in conjunction with a gun boot, and an ATV (shown in phantom)
Figure 2:
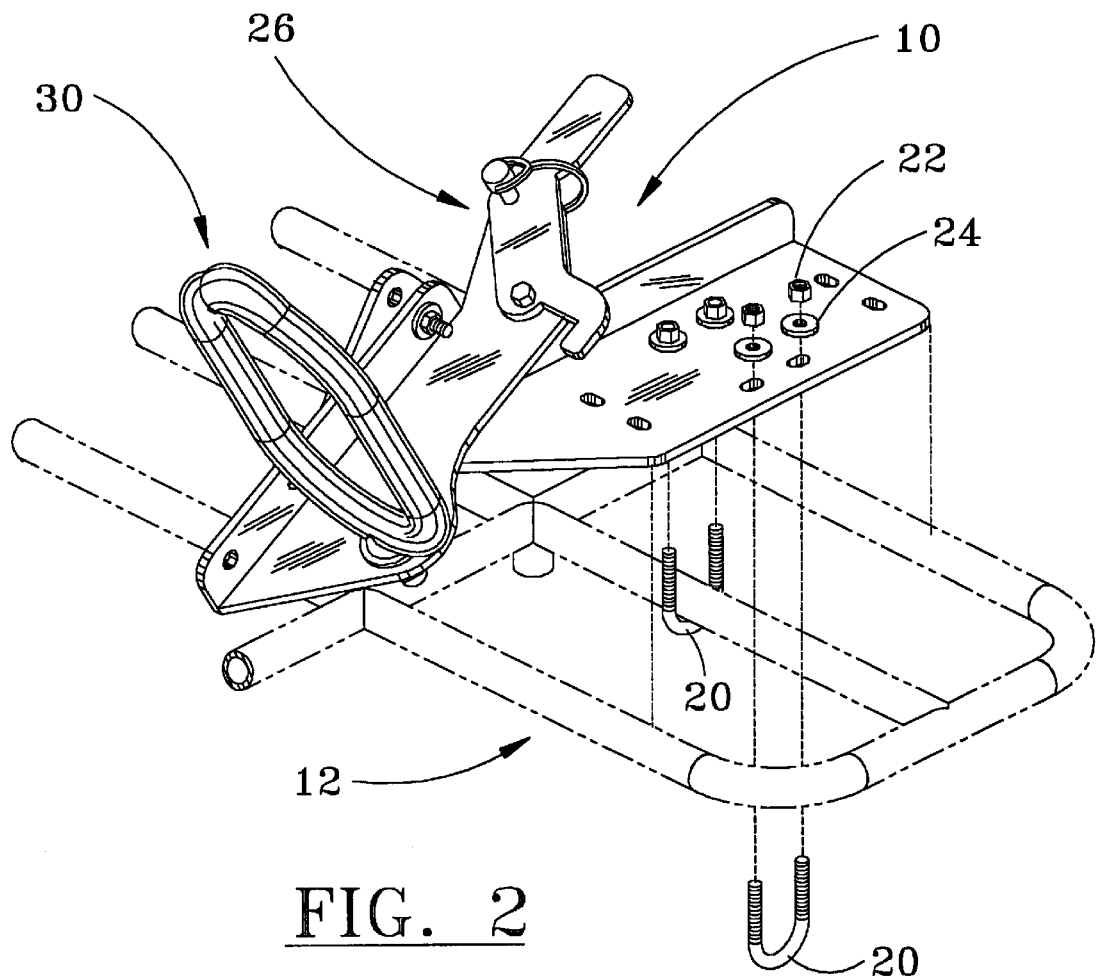
FIG. 2 is an isometric view of the preferred bracket embodiment illustrating a method of mounting the bracket to a portion of an ATV cargo rack (shown in phantom)

As illustrated in FIG. 1 the preferred bracket embodiment 10 may be mounted to the cargo rack assembly 12, shown attached to an ATV, 14 and further illustrates how a rigid gun boot 16 would be carried thereby. The bracket 10 can just as easily be mounted on the far side of the rack 12 or crossways, if desired. The gun boot bracket 10 may also be mounted to the front rack 18. As seen in FIG. 2 the bracket assembly 10 is mountable with U-bolts and nuts and washers 22,24. However, it is anticipated that other types of fasteners and clamps could be used as well to accommodate various types of rack mounting requirements. The pivotal latch assembly 26 coincides with the orifice in the retaining loop 28 generally found on rigid gun boot assemblies 16 as seen in FIG. 3 when the boot is inserted into the bar loop assembly 30 as shown in FIG. 1 and provides positive locking of the boot 16 to the bracket 10.

Figure 4:
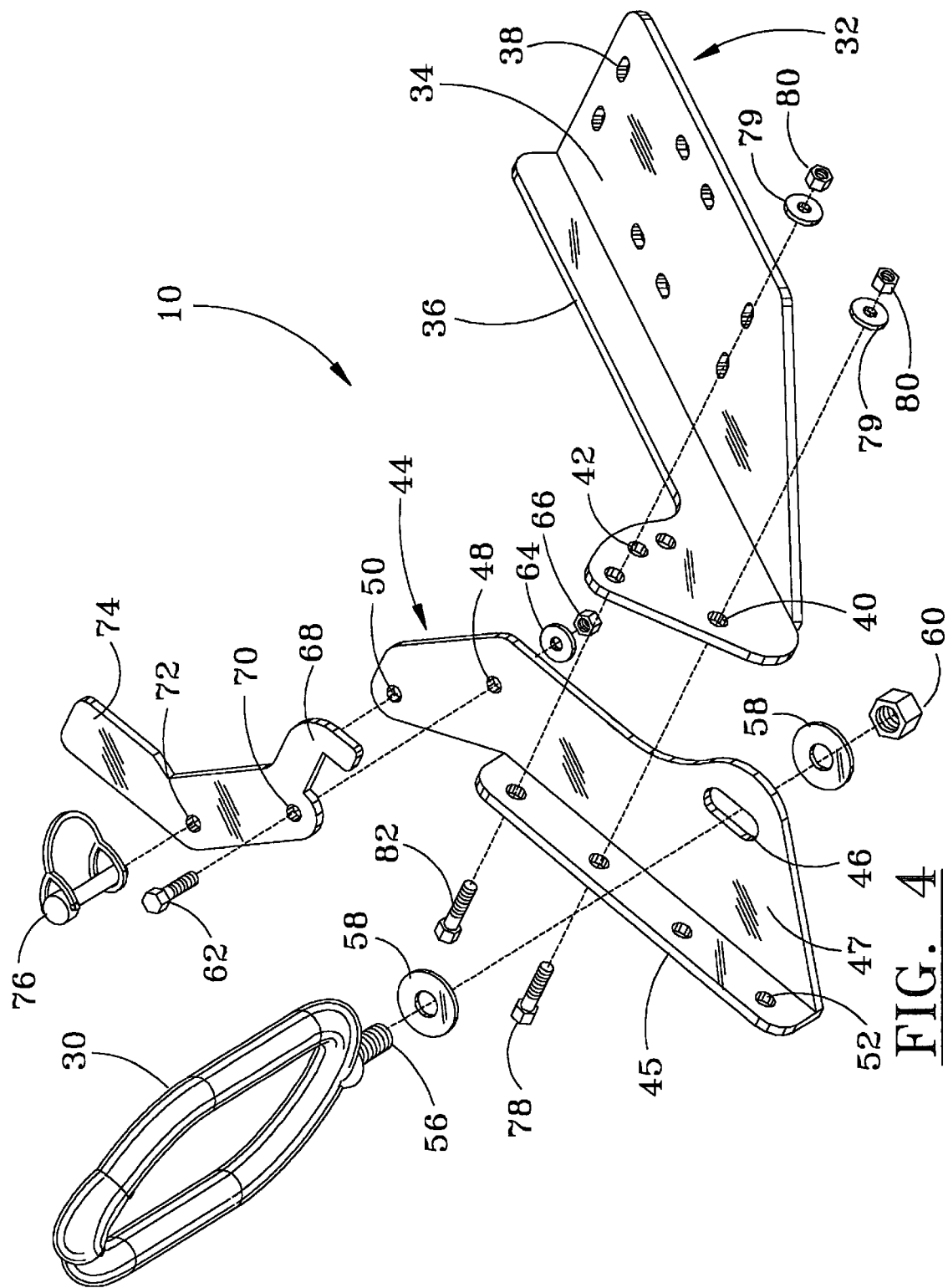
FIG. 4 is an exploded view of the preferred bracket embodiment.

As seen in FIG. 4, the bracket includes a base plate or mounting member 32 having a horizontal portion 34 and a vertical portion 36. The base portion 34 further includes a plurality of holes 38 and may include slots for accommodating fasteners, such as U-bolts and the like. The vertical portion 36 includes a series of holes with one being a pivotal hole 40 and a plurality of positioning holes 42. The bracket 10 further includes a pivot plate member 44 also having a horizontal portion 47 and a vertical portion 45. The horizontal portion 47 has a slotted hole 46, a pivot hole 48, and locking pin hole 50, the vertical portion also having a plurality of pivot pin and positioning holes 52. The bracket assembly 10 further includes a bar loop 30 which is elongated and having a threaded stud portion 56 for rotateably mounting by way of washers 58 and nut 60 through slot 46 in the pivot plate 44. The latch assembly 26, having a finger portion, a pivot hole, a lock pin hole 72, and a handle portion 74, is attached to the pivot plate 44 by a pivot bolt 62 and its washer and nut 64,66 passing through hole 70 and 48 and a safety locking pin 76 passing through holes 72 and 50. This pin 76 may be replaced with a padlock if desired. The pivotal plate 44 is attached to the base plate 32 by pivot bolt 78 passing through one of the holes 52 and hole 40 in the base plate and secured with a washer and nut 79,80 and secured in position angularly with positioning bolt 82 and also secured with a washer and nut 79,80 or a safety pin 76.

Figures 5, 6:
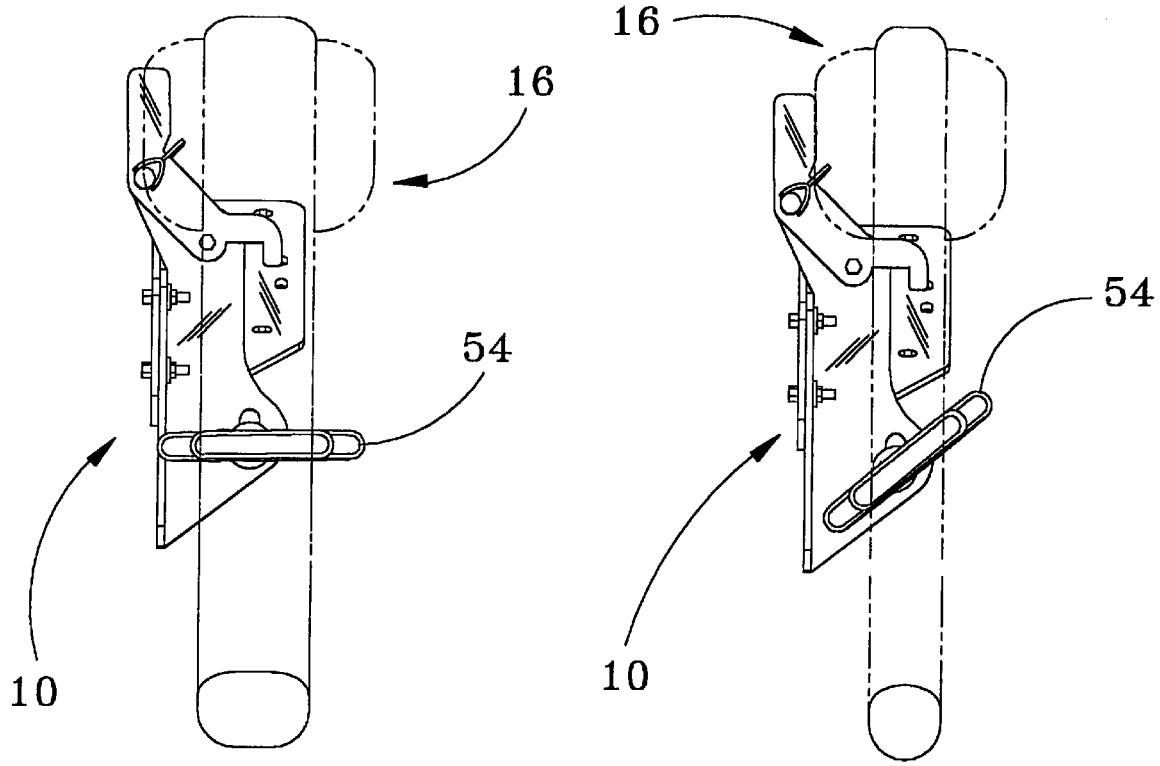
FIG. 5 is a top view of the preferred embodiment with bar loop perpendicular.
FIG. 6 is a top view of the preferred embodiment with bar loop rotated diagonally.

As seen in FIG. 5 the bar loop 30 may be rotated perpendicular to the gun boot 16 or at an oblique angle as seen in FIG. 6. This allows the bar loop to accommodate a variety of gun boot sizes and still insure a snug fit.

Figure 3:
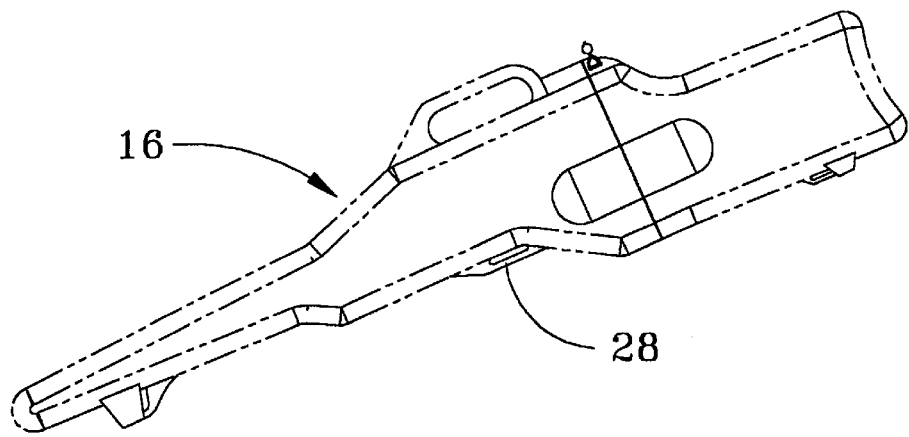
FIG. 3 is a side elevation view of a typical rigid gun boot arrangement (shown in phantom)
Figures 7, 8:
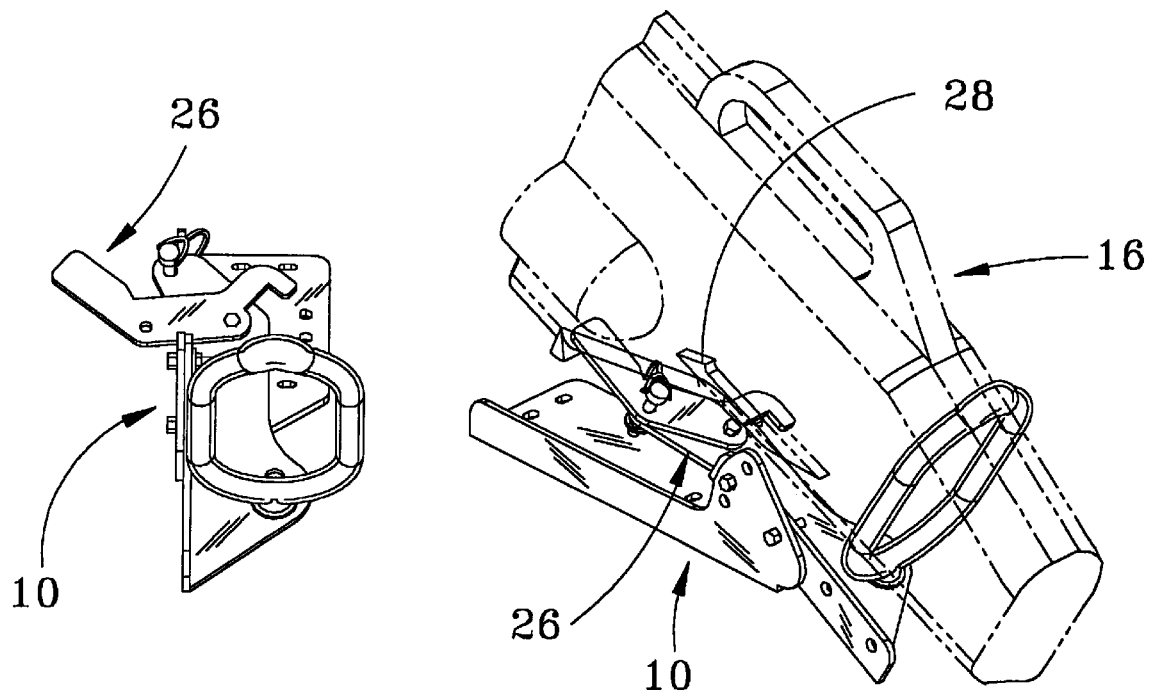
FIG. 7 is an elevated front view of the preferred embodiment.
FIG. 8 is an isometric side elevation view of the preferred embodiment.

The latch assembly 26, shown in the open position in FIG. 7, generally coincides with the retaining loop 28 located on the underside of the gun boot 16, as shown in FIG. 3, and locked in position, as seen in FIG. 8, by the safety pin 76. If the boot retaining loop 28 does not coincide with the latch and the pivot plate 44, seen in FIG. 4, the bar loop 30 may be slidably relocated, thus allowing the best alignment. With the boot 16 in position having its barrel portion inserted through the bar loop 30 as illustrated in FIG. 8, the latch assembly 26 is moved to the lock position with its finger portion inserted in the retaining loop orifice and secured in place with safety pin 76 as seen in FIG. 8. With the gun boot 16 in place, the pivot plate 44 may be positioned and secured in the horizontal position, as seen in FIG. 9, or pivoted to one of three angular positions, as seen in FIG. 10.

It should also be noted that the conical configuration 84 of the gun boot, seen in FIG. 9, determines the penetration of the boot 16 through the bar loop 30 and thus locates the boot retaining loop 28 relative to the latch assembly 26. Therefore, slidably repositioning of the bar loop 30 may be necessary to align the latch 26 and the boot retaining loop as discussed above. It should also be noted that the rigid gun boots 16 are generally configured so that the rear or butt portion 86 of the boot, as seen in FIG. 10, is detachable, thus allowing access to the gun.

As seen herein a variety of gun boots or scabbards 16 may be accommodated by the bracket 10, be held securely in a variety of positions, and attached in a variety of places on cargo racks attached to an ATV. The bracket further allows for convenient access to guns carried within the gun boots 16.

Because many varying and different embodiments may be made within the scope of the inventive concept herein taught, and because many modifications, may be made in the embodiments herein detailed in accordance with the descriptive requirement of the law, it is to be understood that the details herein are to be interpreted as illustrative and not in any limiting sense.

What is claimed is:

1. A mounting bracket adaptable to all-terrain vehicles for attaching a rigid gun boot, the bracket comprising:

a) a formed base plate having horizontal and vertical portions, each of said portions having a plurality of holes therethrough;

b) a formed pivotal plate having horizontal and vertical portions, each of said portions having a plurality of holes therethrough;

c) a fastening means for attaching and pivotally positioning said pivotal plate to said base plate;

d) an elongated bar loop having a threaded portion rotatably attached to said pivotal plate horizontal portion; and e) a swing latch pivotally attached to said pivotal plate for selective engagement with said base plate.

2. The mounting bracket according to claim 1 wherein said pivotal plate is slotted to allow said loop to be slidably adjustable.

3. The mounting bracket according to claim 1 wherein said bracket further includes U-bolts for attaching said base plate to an all-terrain vehicle.

4. The mounting bracket according to claim 1 wherein said pivotal plate is positional longitudinally relative said base plate by repositioning said fastening means within said plurality of holes in said vertical portion.

5. The mounting bracket according to claim 1 wherein said swing latch coincides with a retaining loop found on a variety of gun boots when said boots are inserted into said elongated bar loop.

6. The mounting bracket according to claim 1 wherein said swing latch is secured in a lock position by a safety pin.

7. A mounting bracket adaptable to all-terrain vehicles for attaching a rigid gun boot, the bracket comprising:

a) a formed base plate having horizontal and vertical portions, each of said portions having a plurality of holes therethrough;

b) a formed pivotal plate having horizontal and vertical portions, each of said portions having a plurality of holes therethrough, one of said holes in said horizontal portion being slotted;

c) a fastening means for attaching and pivotally positioning said pivotal plate, to said base plate;

d) an elongated bar loop having a threaded portion rotatably and slidably attached to said pivotal plate horizontal portion by passing said threaded portion through said slotted hole;

e) a swing latch pivotally attached to said pivotal plate and held in a lock position by a pin; and f) a plurality of U-bolts.

8. The mounting bracket according to claim 7 wherein said pivotal plate is positional longitudinally relative to said base plate by repositioning said fastening means within said plurality of holes in said vertical portion.

9. A method for securing a rigid gun boot to a cargo rack attached to an all-terrain vehicle comprising the steps of:

a) providing a bracket comprising:
   i) a formed base plate having horizontal and vertical portions, each of said portions having a plurality of holes therethrough;
   ii) a formed pivotal plate having horizontal and vertical portions, each of said portions having a plurality of holes therethrough;
   iii) a fastening means for attaching and pivotally positioning said pivotal plate, to said base plate;
   iv) an elongated bar loop having a threaded portion rotatably attached to said pivotal plate horizontal portion; and
   v) a swing latch pivotally attached to said pivotal plate for selective engagement with said base plate;

b) adapting said bracket to an all-terrain vehicle;

c) inserting a portion of a rigid gun boot, having a retaining loop mid way along its base, through said bar loop until said retaining loop coincides with said swing latch;

d) pivoting said swing latch through said retaining loop and securing said latch in position with a pin; and e) rotating said bar loop to contact sides of said rigid gun boot and securing said bar loop in position.

10. The method according to claim 9 wherein said method further includes the step of adjustably positioning said pivotal plate longitudinally relative to said base plate.

11. The method according to claim 9 wherein said method further includes the step of rotationally positioning said pivotal plate relative to said base plate.

* * * * *